United States Patent Office 3,320,249
Patented May 16, 1967

3,320,249
ADAMANTYL DERIVATIVES OF PHENO-
THIAZINES
Jack Bernstein, New Brunswick, N.J., assignor to Olin
Mathieson Chemical Corporation, New York, N.Y., a
corporation of Virginia
No Drawing. Filed July 9, 1965, Ser. No. 470,930
14 Claims. (Cl. 260—243)

This invention relates to new compounds of the formula (I)

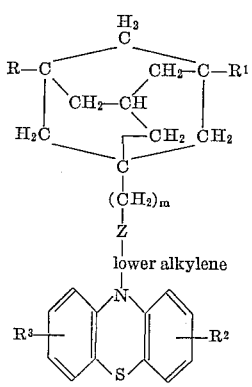

and to acid-addition and quaternary ammonium salts thereof.

In Formula I, R and $R^1$ each is hydrogen, halo, lower alkyl, phenyl or lower alkoxy. $R^2$ and $R^3$ each is hydrogen, halogen, trifluoromethyl, lower alkyl or lower alkoxy. The symbol $m$ represents an integer from 0 to 7, preferably 0, 1 or 2. Z represents a nitrogen containing group such as those of the formula II (II)

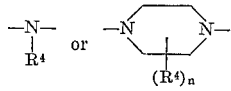

wherein $R^4$ is hydrogen or lower alkyl, and $n$ is 1 or 2, e.g., amino, lower alkyl-amino, such as methylamino, ethylamino or the like, piperazino, lower alkylpiperazino such as 2- or 3-methylpiperazino, and di-lower alkyl-piperazino, such as 2,5-dimethylpiperazino. The attachment to the alkylene group is through a nitrogen atom.

The halogens represented by R, $R^1$, $R^2$ and $R^3$ include chlorine, bromine, iodine and fluorine, but the first two are preferred. Lower alkyl groups represented by the symbols include straight and branched chain aliphatic groups such as methyl, ethyl, propyl, isopropyl, butyl, isobutyl, t-butyl, amyl, isoamyl and the like. Methyl and ethyl are preferred. The lower alkoxy groups are ether groups having alkyl groups of the foregoing character attached to the oxygen.

The lower alkylene groups are straight or branched chain, divalent aliphatic hydrocarbon groups of the same type as the lower alkyl groups referred to above. Two to three carbon chains are preferred.

The new compounds of this invention may be produced by a variety of methods. According to one method, a substituted or unsubstituted adamantanamine, i.e., one in which R, $R^1$ or $R^4$ are hydrogen or any of the other substituents represented by the respective symbols, is reacted with a haloacyl halide to obtain a haloalkanoyl-adamantanamine, which is reduced, e.g., with lithium aluminum hydride, to the corresponding adamantylamino-alkyl halide. The last is then reacted with a substituted or unsubstituted phenothiazine to obtain the product of Formula I.

Alternatively, the same starting material is converted to an adamantylamino alkanol, e.g., with an alkylene oxide such as ethylene oxide, propylene oxide or the like, and the alkanol is converted to the corresponding alkyl halide, e.g., with a thionyl halide such as thionyl chloride or thionyl bromide. Then this product is reacted with a substituted or unsubstituted 2-(trifluoromethyl)pheno-thiazine to obtain the same product as by the first procedure.

Suitable starting materials for compounds of formula I include, for example, 1-adamantylamine, 3-methyl-1-adamantylamine, 3-phenyl-1-adamantylamine, 3-methoxy-1-adamantylamine, 3-ethoxy-1-adamantylamine, 3-fluoro-, 3-chloro-, 3-bromo- and 3-iodo-1-adamantylamine, 3,5-dimethyl-1-adamantylamine, as well as the adamantyl-lower alkylamines and N-alkyl compounds corresponding to the above.

These amines may be prepared by the reduction of an N-acyl-adamantylamine such as N-(1-adamantyl)aceta-mide with lithium aluminum hydride or by the alkylation of an adamantylamine such as 1-adamantylamine with an alkyl halide such as methyl iodide.

A further alternate comprises reacting an N-alkylacyl-amide, such as N-ethylacetamide, with a haloadamantane such as 1-bromo-adamantane and hydrolyzing the N-ethyl-N-(1-adamantyl)-acetamide to the N-ethyl-1-adamantylamine.

Reduction of an adamantanecarboxamide such as N-methyl-1-adamantanecarboxamide with lithium aluminum hydride yields suitable starting amines for those derivatives in which $m$ is one. Similarly, the reduction of an adamantanylacetamide yields derivatives in which $m$ is two.

Phenothiazines which may be utilized to produce compounds of Formula I include, for example, 2-chloropheno-thiazine, 2-methoxyphenothiazine, 2-(trfluoromethyl) phenothiazine, 2-tertiarybutylphenothiazine, 4-(trifluoro-methyl)phenothiazine, 3-chlorophenothiazine, 2-methoxy-7-chlorophenothiazine, 2-fluorophenothiazine, etc.

Preferred compounds of this invention are those wherein Z represents -N-methyl or piperazinyl, the lower alkylene group has 2 to 3 carbon atoms, $R^2$ is trifluoromethyl, especially in the 2-position; R, $R^1$ and $R^3$ are all hydrogen, $R^4$ is lower alkyl and $m$ is 0 to 1.

The bases of Formula I form acid-addition salts with a variety of inorganic and organic acids. Such salts include, for example, the hydrohalides, e.g., hydrochloride, hydrobromide, etc., sulfate, phosphate, nitrate, arylsul-fonates, e.g., camphorsulfonate benzenesulfonate, tolu-enesulfonate, etc., citrate, oxalate, ascorbate, acetate, tartrate, salicylate and the like. It is frequently convenient to isolate the compound by forming the acid salt and precipitating in a medium in which it is insoluble. The free base may then be obtained by neutralization. The bases also form quaternary ammonium salts with quaternizing agents which are acceptable for pharmaceutical use, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl chloride, benzyl sulfate, etc. This is accomplished by reacting the base with the alkyl halide, sulfate, or the like.

The compounds of this invention are therapeutically active substances which possess central depressant activity. They are useful in the treatment of conditions such as Parkinsonism or as tranquilizers, sedatives or anti-emetics. They may be administered orally or parenterally in the form of tablets, capsules, elixirs, injectables or the like by incorporating the appropriate dosage (e.g., 10 to 250 mg.) of the base of Formula I or a physiologically acceptable acid-addition salt or quaternary ammonium salt thereof in a conventional vehicle together with excipients, lubricants, preservatives, stabilizers and the like, as required according to accepted pharmaceutical practice.

The following examples are illustrative of the invention. All temperatures are expressed on the centigrade scale.

EXAMPLE 1 propyl] - 2 - (trifluoromethyl) - phenathiazine hydrochloride (a) *Preparation of N - (1 - adamantyl) - 3-chloro-N-methylpropionamide.*—With ice cooling and stirring, 37.1 grams of β-chloropropionyl chloride in 100 ml. of anhydrous benzene is added dropwise to 100 grams of 1-(methylamino)adamantane in 200 ml. of anhydrous benzene. The reaction mixture is then refluxed for 5 hours, filtered and the filtrate washed with water and dried over anhydrous magnesium sulfate. The ether is removed by distillation and the N-(1-adamantyl)-3-chloro-N-methylpropionamide thus obtained may be used without further purification. If desired, the product may be purified by fractional distillation.

(b) *Preparation of N-(3 - chloropropyl) - N - methyl-1-adamantanamine.*—To 38 grams of lithium aluminum hydride in 200 ml. of anhydrous ether is added dropwise a solution of 25 grams of N-(1-adamantyl)-3-chloro-N-methylpropionamide in 400 ml. of anhydrous ether. The mixture is then refluxed for one hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantanamine.

(c) *Preparation of 10 - [3 - (N - methyl-1-adamantylamino) - propyl] - 2 - (trifluoromethyl)phenothiazine hydrochloride.*—A mixture of 26.7 grams of 2-(trifluoromethyl)-phenothiazine, 4.1 grams of sodamide, 29 grams of N-(3-chloropropyl)-N-methyl-1-adamantanamine and 500 ml. of dry xylene is stirred and refluxed for 17 hours. The hot solution is filtered and the filtrate is concentrated under reduced pressure. The residue is dissolved in 400 ml. of ether and the solution is extracted with 5% aqueous hydrochloric acid (3 portions of 150 ml. each). The hydrochloric acid extracts are combined, washed with ether and then made strongly alkaline with 40% aqueous sodium hydroxide. The mixture is then extracted with ether, the ether extracts dried over anhydrous magnesium sulfate and concentrated by distillation. The residue is distilled under reduced pressure to yield the desired N-[3-(N-methyl-1-adamanthylamino)propyl]-2-(trifluoromethyl)phenothiazine.

The base is dissolved in 300 ml. of anhydrous ether and treated with a slight excess of ethereal hydrogen chloride. The precipitated solid is filtered and dried to yield the desired hydrochloride of N - [3 - (N - methyl-1-adamantylamino)propyl] - 2 - (trifluoromethyl)phenothiazine. The hydrochloride may be further purified by crystallization from a mixture of alcohol and ether.

EXAMPLE 2

*Preparation of 10 - [2 - (N-methyl - 1 - adamantylamino) ethyl]-2-chlorophenothiazine hydrochloride*

(a) *Preparation of 2-(N-methyl - 1 - adamantylamino) ethanol.*—A 140 ml. stainless steel bomb is charged with 16.5 grams of N-methyl-1-adamantylamine, 5.0 grams of ethylene oxide and 50 ml. of aqueous tetrahydrofuran and heated at 70° for 12 hours. The solvent is removed by distillation and the residue fractionally distilled to yield the desired 2 - (N - methyl - 1-adamantylamino) ethanol.

(b) *Preparation of N - (2 - bromoethyl) - N-methyl-1 - adamantylamine hydrobromide.*—A solution of 20.9 grams of 2-(N-methyl-1-adamantylamino)-ethanol in 100 ml. of chloroform is cooled to 0° and a solution of 30 grams of thionyl bromide in 150 ml. of chloroform is added dropwise with vigorous stirring, while the temperature is maintained at 0–5°. The reaction mixture is then allowed to warm to room temperature, diluted with anhydrous ether and filtered to recover the N-(2-bromoethyl)-N-methyl-1-adamantylamine hydrobromide. This may be recrystallized from a mixture of ethanol and ether.

(c) *Preparation of 10 - [2 - (N-methyl-1-adamantylamino)ethyl] - 2-chlorophenothiazine hydrochloride.*—A mixture of 16.5 grams of 2-chlorophenothiazine and 3.5 grams of sodamide in 400 ml. of dry toluene is refluxed gently for 6 hours while a slow stream of nitrogen is bubbled through the mixture. The reaction mixture is then cooled and a solution of N-(2-bromoethyl)-N-methyl-1-adamantylamine in dry toluene (prepared from 35 grams of N-(2-bromoethyl)-N-methyl-1-adamantylamine hydrobromide by extracting, with toluene, an aqueous solution of the amine that has been made alkaline with potassium carbonate and drying the toluene extracts over anhydrous magnesium sulfate) is added dropwise with vigorous stirring. The reaction mixture is then refluxed for an additional 6 hours, filtered and the filtrate concentrated under reduced pressure to remove the solvent. The residue is dissolved in chloroform, refluxed with decolorizing carbon, and filtered hot. The filtrate is concentrated under reduced pressure and the residue distilled under reduced pressure to yield the desired 10-[2 - (N-methyl-1-adamantylamino)ethyl]-2-chlorophenothiazine.

The hydrochloride is prepared by treating an ethereal solution of the base with an equivalent of ethereal hydrogen chloride.

Following the procedure of Example 2 but substituting the indicated substituted phenothiazine for the 2-chlorophenothiazine in part (c), there is formed the designated 10 - [2 - (N-methyl-1-adamantylamino)ethyl]-R$^2$-phenothiazine hydrochloride.

| Example | Reactant | Product: R$^2$ is— |
|---|---|---|
| 3 | 2-trifluoromethylphenothiazine | 2-trifluoromethyl. |
| 4 | 4-chlorophenothiazine | 4-chloro. |
| 5 | 2-methoxyphenothiazine | 2-methoxy. |
| 6 | 3-chlorophenothiazine | 3-chloro. |
| 7 | 2-methoxy-7-chlorophenothiazine | 2-methoxy-7-chloro. |
| 8 | 2-tertiarybutylphenothiazine | 2-tertiarybutyl. |

EXAMPLE 9

*Preparation of 10-[2-(N-ethyl-3-methyl - 1 - adamantylamino)ethyl]-2-chlorophenothiazine hydrochloride*

(a) *Preparation of 1-ethylamino - 3 - methyladamantane.*—A mixture of 60 grams of N-ethylacetamide, 45 grams of 1-bromo-3-methyladamantane and 60 grams of silver sulfate is heated at 100° for 1 hour. The cooled mixture is treated with 100 ml. of water and extracted with ether. The ether extracts are combined, dried over anhydrous magnesium sulfate and concentrated under reduced pressure to yield 1-(N-ethylacetamido)-3-methyladamantane.

A mixture of 12 grams of 1-(N-ethylacetamido)-3-methyladamantane, 12 grams of sodium hyroxide and 120 ml. of diethyleneglycol is refluxed for 5 hours. The cooled mixture is poured into 1 liter of water and extracted with ether. The combined ether extracts are dried over anhydrous potassium carbonate and the ether removed by distillation to yield the 1-ethylamino-3-methyladamantane.

(b) *Preparation of 10-[2(N-ethyl-3-methyl-1-adamantylamino)ethyl]-2 - chlorophenothiazine hydrochloride.*—Following the procedure of Example 2 but substituting an equivalent amount of the 1-ethylamino-3-methyladamantane for the N-methyl-1-adamantylamine in part (a), there is obtained 10-[2-(N-ethyl-3-methyl-1-adamantylamino)ethyl]-2-chlorophenothiazine hydrochloride.

EXAMPLE 10

*Preparation of 10-[3-(N-methyl-3-methoxy-1-adamantyl-methylamino)propyl] - 2 - (trifluoromethyl)phenothiazine hydrochloride*

(a) *Preparation of N-methyl-3-methoxy - 1 - adamantanecarboxamide.*—A mixture of 10 grams of 3-methoxy-1-adamantanecarboxylic acid and 20 ml. of thionyl chloride are heated under reflux for 30 minutes. The excess thionyl chloride is remoevd by distillation under reduced pressure. Ten ml. of anhydrous benzene is added and the benzene removed by distillation under reduced pressure. The cooled residue is treated with a solution of methylamine in benzene. After several hours, the precipitated solid is removed by filtration, and the filtrate concentrated under reduced pressure to yield N-methyl-3-methoxy-1-adamantanecarboxamide.

(b) *Preparation of N-(3-methoxy-1-adamantylmethyl) methylamine.*—A solution of 10 grams of N-methyl-3-methoxy-1-adamantanecarboxamide in anhydrous ether is added slowly to a suspension of lithium aluminum hydride in anhydrous ether. After the addition is completed, the reaction mixture is heated to gentle reflux for 4 hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous magnesium sulfate and concentrated under reduced pressure to yield the N - (3-methoxy-1-adamantylmethyl) methylamine.

(c) *Preparation of 10-[3-(N-methyl-3-methoxy-1-adamantylmethylamino)propyl] - 2 - (trifluoromethyl)phenothiazine hydrochloride.*—Following the procedure of Example 1 but substituting an equivalent amount of N-(3-methoxy-1-adamantylmethyl)methylamine for the 1-methylaminoadamantane in part (a), there is obtained 10-[3-(N - methyl-3-methoxy-1-adamantylmethylamino)propyl-2-(trifluoromethyl)phenothiazine hydrochloride.

Similarly, by replacing the 3-methoxy-1-adamantanecarboxylic acid with an equivalent amount of 3-phenyl-1-adamantanecarboxylic acid in part (a), there is obtained 10 - [3 - (N-methyl-3-phenyl-1-adamantylmethylamino) propyl] - 2-(trifluoromethyl)phenothiazine hydrochloride. Replacement with 3-bromo-1-adamantanecarboxylic acid yields the corresponding 10-[3-(N methyl-3-bromo-1-adamantylmethylamino)propyl] - 2-(trifluoromethyl)phenothiazine hydrochloride.

EXAMPLE 11

*Preparation of 10 - {3-[4-(1-adamantylmethyl)-1-piperazinyl]propyl}-2-(trifluoromethyl)phenothiazine maleic acid salt*

(a) *Preparation of 10-{3-[4-(1-adamantoyl)-1-piperazinyl]propyl}-2 - (trifluoromethyl)phenothiazine.*—To a solution of 20 grams of 10-[3-(1-piperazinyl)propyl]-2-(trifluoromethyl)phenothiazine in anhydrous toluene, there is added dropwise with vigorous stirring, a solution of 10 grams of 1-adamantanecarboxylic acid chloride. The mixture is then refluxed for 1 hour, cooled and dilute sodium hydroxide solution added. The mixture is shaken vigorously and the organic layer is separated. The aqueous layer is extracted several times with ether and the toluene and ether extracts combined. The combined extracts are dried over anhydrous magnesium sulfate, and then concentrated under reduced pressure to yield the desired product.

(b) *Preparation of 10 - {3-[4-(1-adamantylmethyl)-1-piperazinyl]propyl} - 2 - (trifluoromethyl)phenothiazine, maleic acid salt.*—To 3.8 grams of lithium aluminum hydride in 200 ml. of anhydrous ether is added dropwise a solution of 10-{3-[4-(1-adamantoyl)-1-piperazinyl]propyl}-2-(trifluoromethyl)phenothiazine in anhydrous ether. The mixture is refluxed for 1 hour, cooled in ice, treated with 2.5 ml. of water and then 2.5 ml. of 20% aqueous sodium hydroxide. The mixture is filtered, dried over anhydrous potassium carbonate and then concentrated under reduced pressure to remove the solvent.

The residue is dissolved in dry acetonitrile and treated with an equivalent amount of a warm solution of maleic acid in acetonitrile. Addition of anhydrous ether completes the precipitation of the salt which is recovered by filtration.

EXAMPLE 12

*Preparation of 10-{3-[2-(1-adamantyl)ethylamino]propyl}-2-(trifluoromethyl)phenothiazine hydrochloride*

(a) *Preparation of 10-[3-(1-adamantylacetamido)propyl]-2-(trifluoromethyl)phenothiazine.*—To a solution of 16.3 grams of 10-(3-aminopropyl)-2-(trifluoromethyl)-phenothiazine and 6 grams of N-methylmorpholine in anhydrous benzene, there is added dropwise a solution of 1-adamantylacetyl chloride (prepared by treatment of 9.7 grams of 1-adamantylacetic acid with thionyl chloride) in anhydrous benzene. The reaction mixture is then refluxed for 1 hour and cooled. The precipitated N-methyl morpholine hydrochloride is removed by filtration and the benzene solution extracted several times with dilute hydrochloric acid. The benzene solution is then dried over anhydrous magnesium sulfate, filtered and concentrated under reduced pressure to yield the desired 10 - [3-(1-adamantylacetamide)-propyl]-2-(trifluoromethyl)phenothiazine.

(b) *Preparation of 10 - {3-[2-(1-adamantyl)ethylamino]propyl} - 2-(trifluoromethyl)phenothiazine hydrochloride.*—To 3.8 grams of lithium aluminum hydride in 200 ml. of anhydrous ether is added dropwise a solution of 10 - [3-(1-adamantylacetamido)propyl]-2-(trifluoromethyl)phenothiazine in anhydrous ether. The mixture is refluxed for 1 hour after the addition is completed and is then cooled in ice water and treated cautiously with 2.5 ml. of water, followed by 2.5 ml. of 20% aqueous sodium hydroxide. The mixture is filtered, dried over anhydrous potassium carbonate, treated with decolorizing charcoal and filtered. The filtrate is treated with an etheral solution of hydrogen chloride until the pH of the solution is below 3 and the precipitated solid is filtered. The hydrochloride of 10-{3-[2-(1-adamantyl)ethylamino]propyl} - 2 - (trifluoromethyl)phenothiazine thus obtained may be recrystallized from a mixture of absolute alcohol and anhydrous ether.

What is claimed is:

1. A compound selected from the group consisting of a base of the formula

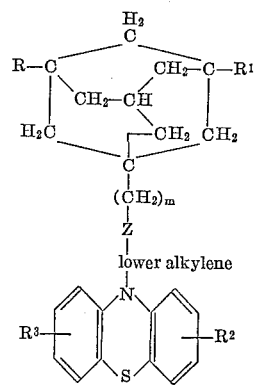

wherein R and R[1] each is a member of the group consisting of hydrogen, halo, lower alkyl, phenyl, and lower alkoxy; R[2] and R[3] each is a member of the group consisting of hydrogen, halo, trifluoromethyl, lower alkyl and lower alkoxy; Z is a member of the group consisting of

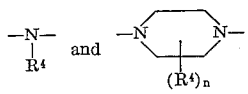

R⁴ is a member of the group consisting of hydrogen and lower alkyl, $m$ is an integer from 0 to 7, and $n$ is an integer from 1 to 2, a pharmaceutically acceptable acid-addition salt thereof, and a pharmaceutically acceptable quaternary ammonium salt thereof.

2. A compound of the formula

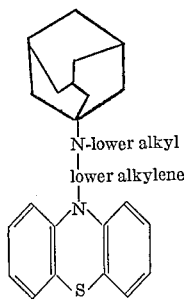

3. A compound of the formula

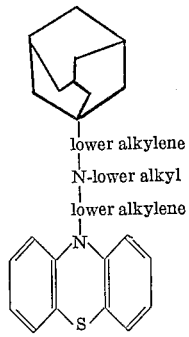

4. A compound of the formula

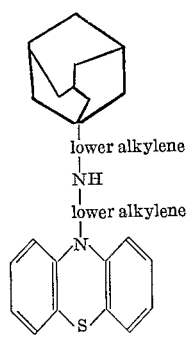

5. A compound of the formula

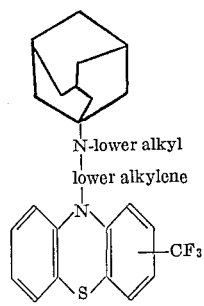

6. A compound of the formula

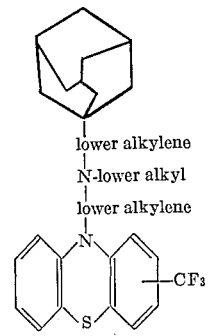

7. A compound of the formula

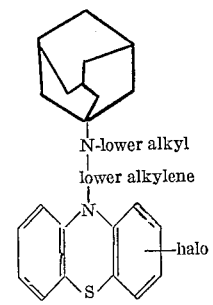

8. A compound of the formula

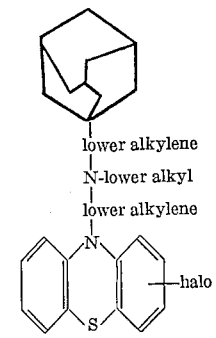

9. A pharmaceutically acceptable acid-addition salt of a compound of claim 5.

10. A pharmaceutically acceptable acid-addition salt of a compound of claim 7.

11. 10 - [3 - (N-methyl-1-adamantylamino)propyl]-2-(trifluoromethyl)phenothiazine.

12. 10 - [2 - (N-methyl-1-adamantylamino)ethyl]-2-chlorophenothiazine.

13. 10 - [2 - (N - ethyl - 3 - methyl-1-adamantylamino)-ethyl]-2-chlorophenothiazine.

14. 10 - {3 - [4 - (1 - adamantylmethyl)-1-piperazinyl]-propyl}-2-(trifluoromethyl)phenothiazine.

No references cited.

WALTER A. MODANCE, *Primary Examiner.*

HARRY I. MOATZ, *Assistant Examiner.*